(12) United States Patent
Wang et al.

(10) Patent No.: US 11,007,435 B2
(45) Date of Patent: May 18, 2021

(54) INTERACTIVE INTERFACE FOR ENABLING AND DISABLING INPUT METHOD

(71) Applicant: TENCENT TECHNOLOGY (SHENZHEN) COMPANY LIMITED, Guangdong (CN)

(72) Inventors: Weiguang Wang, Shenzhen (CN); Zhiming Nie, Shenzhen (CN); Feng AI, Shenzhen (CN); Congbing Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 525 days.

(21) Appl. No.: 15/774,344

(22) PCT Filed: Jan. 25, 2017

(86) PCT No.: PCT/CN2017/072540
§ 371 (c)(1),
(2) Date: May 8, 2018

(87) PCT Pub. No.: WO2017/129120
PCT Pub. Date: Aug. 3, 2017

(65) Prior Publication Data
US 2020/0246697 A1    Aug. 6, 2020

(30) Foreign Application Priority Data

Jan. 29, 2016   (CN) .......................... 201610067261.4

(51) Int. Cl.
*A63F 13/335* (2014.01)
*G06F 3/048* (2013.01)
(Continued)

(52) U.S. Cl.
CPC .............. *A63F 13/42* (2014.09); *A63F 13/35* (2014.09); *G06F 9/451* (2018.02); *A63F 13/335* (2014.09); *G06F 3/048* (2013.01); *G06F 8/38* (2013.01)

(58) Field of Classification Search
None
See application file for complete search history.

(56) References Cited

U.S. PATENT DOCUMENTS

2002/0086732 A1* 7/2002 Kirmse ................. A63F 13/795
463/42
2010/0211883 A1* 8/2010 Lee ....................... H04L 12/282
715/740

FOREIGN PATENT DOCUMENTS

| CN | 101286093 A | 10/2008 |
|---|---|---|
| CN | 102427448 A | 4/2012 |
| CN | 105653066 A | 6/2016 |

OTHER PUBLICATIONS

International Search Report for PCT/CN2017/072540 dated May 4, 2017 [PCT/ISA/210].

* cited by examiner

*Primary Examiner* — Damon J Pierce
(74) *Attorney, Agent, or Firm* — Sughrue Mion, PLLC

(57) ABSTRACT

The present disclosure discloses an input method processing method, applied to a cloud interaction system. The cloud interaction system includes a user equipment and a server. The method includes: sending, by the user equipment, an input method enabling request to the server after receiving an input method enabling instruction; encoding, by the server, input method enabling indication information to first data according to the input method enabling request, to obtain first instruction data, and sending the first instruction data to the user equipment; enabling, by the user equipment, (Continued)

a local input method according to the input method enabling indication information obtained by decoding the first instruction data, and rendering a first interactive application interface and a task graph of the local input method according to the first instruction data. The input method processing method provided in the embodiments can ensure that the local input method can always be normally displayed on the interactive application interface when the interactive application interface is in any state.

19 Claims, 10 Drawing Sheets

(51) Int. Cl.
  *G06F 8/38* (2018.01)
  *G06F 9/451* (2018.01)
  *A63F 13/42* (2014.01)
  *A63F 13/35* (2014.01)

INTERACTIVE INTERFACE FOR ENABLING AND DISABLING INPUT METHOD

CROSS-REFERENCE TO RELATED APPLICATIONS

This application is a U.S. national stage application under 35 USC 371 of International Application No. PCT/CN2017/072540, filed on Jan. 25, 2017 in the Chinese Patent Office, which claims priority to Chinese Patent Application No. 201610067261.4, filed on Jan. 29, 2016 in the Chinese Patent Office, the disclosures of which are incorporated by reference in their entireties.

BACKGROUND

1. Field

Methods and apparatuses consistent with exemplary embodiments relate to the field of cloud technologies, and specifically, to apparatuses and methods for input method processing method.

2. Description of the Related Art

As network bandwidths are rapidly developed and cloud computing technologies are gradually matured in recent years, cloud interaction systems are generated. An existing cloud interaction system generally includes a server and multiple user equipments. The server may be a server cluster. Multiple interactive applications can all run in the cloud interaction system. When the cloud interaction system includes applications related to an input method and some interactive applications in the related art technology, text usually needs to be inputted in the applications, to facilitate communication with another user in the applications.

Text is usually inputted in an interactive application by using a local input method. The local input method is an input method installed on a user equipment. When the local input method needs to be used, a user triggers to enable the local input method. When the local input method does not need to be used, the user triggers to disable the local input method. Both enabling and disabling of the input method can be controlled by operating the user equipment.

However, in the related art technology, the local input method is separate from the interactive application, and when an interactive application interface is in a full-screen state, the local input method cannot be displayed, and consequently text cannot be inputted on the interactive application interface.

SUMMARY

One or more exemplary embodiments provide an input method processing method. A server may encode an input method indication instruction to data of a user rendering interface of an interactive application, to control a local input method on a user equipment to be displayed on the interactive application interface, and to ensure that the local input method can always be normally displayed on the interactive application interface when the interactive application interface is in any state.

According to an aspect of an exemplary embodiment, there is provided an input method processing method in a cloud interaction system, the cloud interaction system including a user equipment and a server, the method performed by at least one computer processor and including: transmitting, by the user equipment, an input method enabling request to the server in response to receiving an input method enabling instruction, the input method enabling request being used to instruct the server to encode input method enabling indication information to first data, to obtain first instruction data; receiving, by the user equipment, the first instruction data from the server; enabling, by the user equipment, a local input method according to the input method enabling indication information obtained by decoding the first instruction data; and rendering, by the user equipment, a first interactive application interface and a task graph of the local input method according to the first instruction data.

The method may further include: obtaining, by the user equipment, a text inputted according to the local input method; encoding, by the user equipment, the text, to obtain encoding information of the text; and transmitting, by the user equipment, the encoding information to the server, wherein the encoding information is invoked, after being decoded by the server, to interactive application logic to which a current interactive application interface belongs.

The method may further include: transmitting, by the user equipment, an input method disabling request to the server in response to receiving an input method disabling instruction, wherein the input method disabling request is used to instruct the server to encode input method disabling indication information to second data, to obtain second instruction data; receiving, by the user equipment, the second instruction data from the server; and disabling, by the user equipment, the local input method according to the input method disabling indication information obtained by decoding the second instruction data.

The method may further include, after the disabling the local input method: rendering, by the user equipment, a second interactive application interface according to the second instruction data; and displaying, by the user equipment, the second interactive application interface.

The method may further include, after the obtaining, by the user equipment, the text inputted according to the local input method: rendering, by the user equipment, a word-forming character string and/or an alternative character string of the text on the current interactive application interface by using a graphic rendering interface.

According to an aspect of another exemplary embodiment, there is provided an input method processing method in a cloud interaction system, the cloud interaction system including a user equipment and a server, the method performed by at least one computer processor and including: receiving, by the server, an input method enabling request from the user equipment; encoding, by the server, input method enabling indication information to first data according to the input method enabling request, to obtain first instruction data; and transmitting, by the server, the first instruction data to the user equipment, the first instruction data being used by the user equipment to obtain the input method enabling indication information by decoding the first instruction data to enable a local input method, and render a first interactive application interface and a task graph of the local input method.

The method may further include receiving, by the server, encoding information of a text from the user equipment; decoding, by the server, the encoding information, to obtain the text; and invoking, by the server, the text to interactive application logic to which a current interactive application interface belongs.

The method may further include: receiving, by the server, an input method disabling request from the user equipment;

encoding, by the server, input method disabling indication information to second data according to the input method disabling request, to obtain second instruction data; and transmitting, by the server, the second instruction data to the user equipment, wherein the second instruction data is used by the user equipment to obtain input method disabling indication information by decoding the second instruction data to disable the local input method, and render a second interactive application interface.

The method may further include, after the invoking, by the server, the text to the interactive application logic to which the current interactive application interface belongs: transmitting, by the server, the text to another user equipment that displays the current interactive application interface.

According to an aspect of still another exemplary embodiment, there is provided a user equipment in a cloud interaction system, the cloud interaction system including a server and the user equipment, the user equipment including at least one computer processor and at least one memory storing instructions which, when executed by the at least one computer processor, cause the at least one computer processor to: receive an input method enabling instruction; transmit an input method enabling request to the server in response to receiving the input method enabling instruction, the input method enabling request being used to instruct the server to encode input method enabling indication information to first data, to obtain first instruction data, wherein receive the first instruction data from the server; enable a local input method according to the input method enabling indication information obtained by decoding the first instruction data; and render a first interactive application interface and a task graph of the local input method according to the first instruction data.

The instructions, when executed by the at least one computer processor, may further cause the at least one computer processor to: display the first interactive application interface and the task graph of the local input method that are rendered.

The instructions, when executed by the at least one computer processor, may further cause the at least one computer processor to: obtain text inputted according to the local input method; encode the text, to obtain encoding information of the text; and transmit the encoding information to the server, wherein the encoding information is invoked, after being decoded by the server, to interactive application logic to which a current interactive application interface belongs.

The instructions, when executed by the at least one computer processor, may further cause the at least one computer processor to: receive an input method disabling instruction; transmit an input method disabling request to the server in response to receiving the input method disabling instruction, wherein the input method disabling request is used to instruct the server to encode input method disabling indication information to second data, to obtain second instruction data; receive the second instruction data from the server; and disable the local input method according to the input method disabling indication information obtained by decoding the second instruction data.

The user equipment may further include a display, and the instructions, when executed by the at least one computer processor, may further cause the at least one computer processor to: render a second interactive application interface according to the second instruction data; and display the second interactive application interface on the display of the user equipment.

The instructions, when executed by the at least one computer processor, may further cause the at least one computer processor to: render, on the current interactive application interface, a word-forming character string and/or an alternative character string of the text on the current interactive application interface by using a graphic rendering interface.

According to an aspect of another exemplary embodiment, there is provided a server in a cloud interaction system, the cloud interaction system including a user equipment and the server, the server including at least one computer processor and at least one memory storing instructions which, when executed by the at least one computer processor, cause the at least one computer processor to: receive an input method enabling request from the user equipment; encode input method enabling indication information to first data according to the input method enabling request, to obtain first instruction data; and transmit the first instruction data to the user equipment, the first instruction data being used by the user equipment to obtain the input method enabling indication information by decoding the first instruction data to enable a local input method, and render a first interactive application interface and a task graph of the local input method.

The instructions, when executed by the at least one computer processor, may further cause the at least one computer processor to: receive encoding information of text from the user equipment; decode the encoding information, to obtain the text; and invoke the text obtained by decoding to interactive application logic to which a current interactive application interface belongs.

The instructions, when executed by the at least one computer processor, may further cause the at least one computer processor to: receive an input method disabling request from the user equipment; encode input method disabling indication information to second data according to the input method disabling request, to obtain second instruction data; and transmit the second instruction data to the user equipment, wherein the second instruction data is used by the user equipment to obtain the input method disabling indication information by decoding the second instruction data to disable the local input method, and render a second interactive application interface.

The instructions, when executed by the at least one computer processor, may further cause the at least one computer processor to: transmit the text to another user equipment that displays the current interactive application interface.

According to an aspect of still another exemplary embodiment, there is provided a cloud interaction system, including: a user equipment described above and a server described above.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Exemplary embodiments provide an input method processing method. A server may encode an input method indication instruction to data of a user rendering interface of an interactive application, to control a local input method on a user equipment to be displayed on the interactive application interface, and to ensure that the local input method can always be normally displayed on the interactive application interface regardless of whether the interactive application interface is in any certain state. Details descriptions are separately provided below.

In the following description, a detailed description of known functions and configurations will be omitted, when it is determined that the description unnecessarily obscures the subject matter of the disclosure. The terms described below are terms defined in consideration of the functions in the disclosure, and may vary depending on the intention of the user/operator or the customs. Therefore, the definition should be made based on the contents throughout the specification.

The following clearly and completely describes the technical solutions in the exemplary embodiments with reference to the accompanying drawings in the exemplary embodiments. Obviously, the described exemplary embodiments are only some embodiments but not all embodiments. All other embodiments that can be obtained by a person of ordinary skill in the art based on the exemplary embodiments without any creative work fall within the protection scope of the disclosure.

Figure 1:
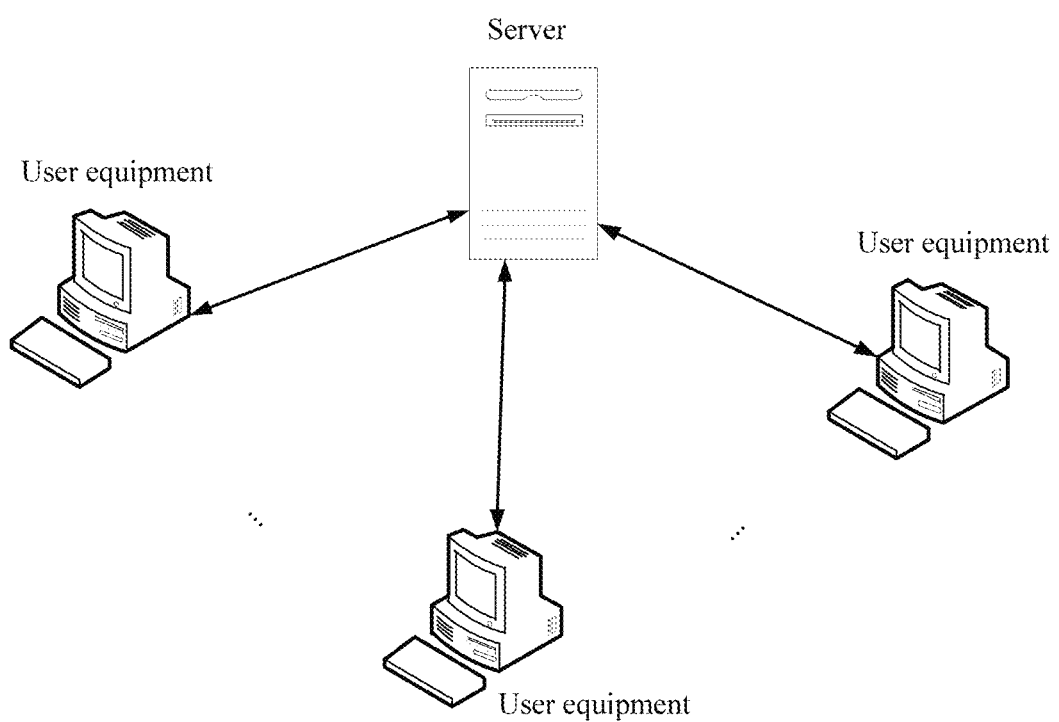
FIG. 1 is a schematic diagram of an example of a cloud interactive system according to an exemplary embodiment.

FIG. 1 is a schematic diagram of an example of a cloud interactive system according to an exemplary embodiment.

Referring to FIG. 1, a cloud interactive system may be understood, for example, as a cloud game system, and generally includes a server and a user equipment. There may be a plurality of user equipments, and the server may be a server cluster. The user equipment may be a terminal device such as a personal computer (PC), a notebook computer, or a mobile phone. The server may be a dedicated game server. A game client may run on the server, and is generally referred to as a Trace end, that is, cloud of a cloud game. The game client runs main logic of the game, and transfers a graphical interface related to user interaction to a Retrace end by using a network. The Retrace end is a client that runs on the user equipment, that is, a user end of the cloud game, and is used to represent a game graphical interface of the Trace end, and transfers input of a device of the user such as a mouse or a keyboard to the Trace end by using a network. Data of the Trace end and the Retrace end is sent to each other by means of streaming after being encoded. Streaming means that only one data stream can be sent at one time.

In a large-scale online multiplayer game, usually, a plurality of user equipments interact with the server, a user may enter text by using a user equipment of the user, and the server synchronizes the text to another user equipment.

An exemplary embodiment involves a Hook function, that is, Hook injection, and an original function execution process is replaced with a self-defined function.

In a cloud game, the input method processing method provided in an exemplary embodiment resolves how the Retrace end uses a local input method of a user to enter text, sends the text to the Trace end by means of streaming, and exchanges text with another player in the game.

The server monitors an input method enabling event. In an exemplary embodiment, an input method event is processed in a manner different from that of an ordinary window program, and a keyboard and a mouse not only can be used in an input method in a game, but also can be used to control the game. Therefore, in a cloud game, the Retrace end needs to know whether an input method of the Trace end is in an enabled state or in a disabled state.

In a cloud game, the user performs entering text at a Retrace end, and a program for controlling enabling and disabling of the input method is at a Trace end.

In an exemplary embodiment, an enabled state or a disabled state of the input method is monitored by using an input method API of a Hook game, and is remotely notified to the Retrace end. This can implement an embodiment in which the user equipment enables or disables the local input method on the user equipment.

Figure 2:
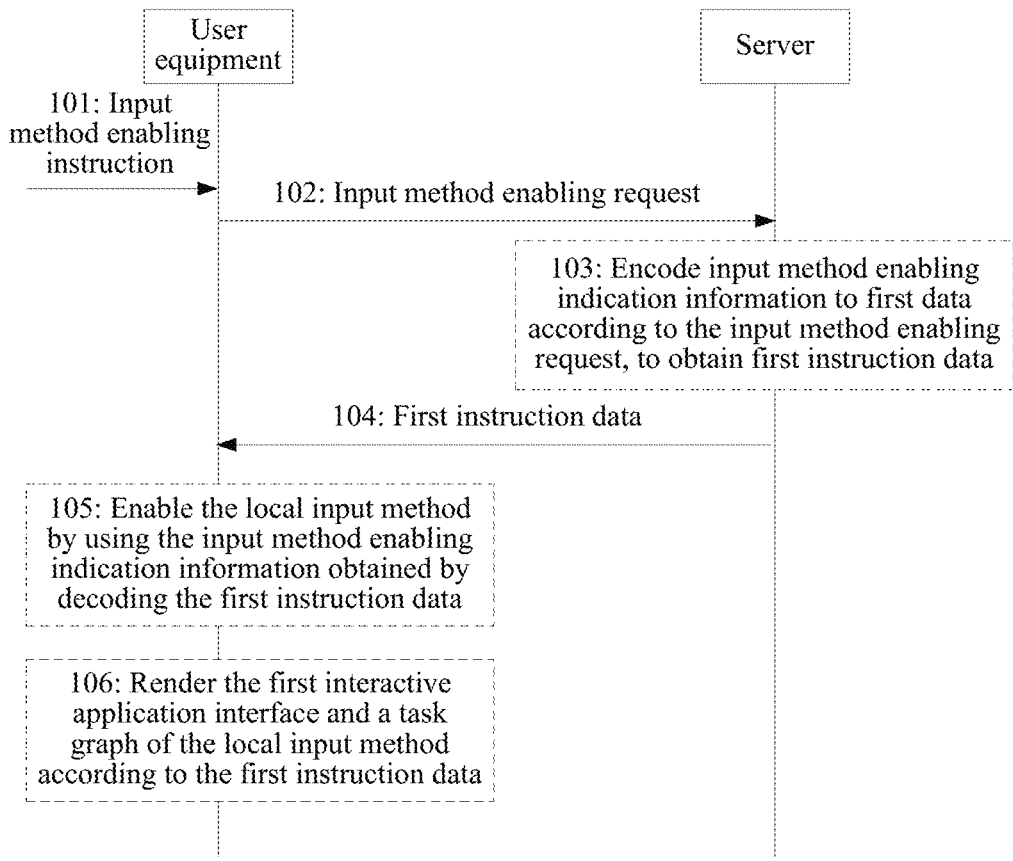
FIG. 2 is a schematic diagram of an example of an input method processing method according to an exemplary embodiment.

FIG. 2 is a schematic diagram of an example of an input method processing method according to an exemplary embodiment.

Referring to FIG. 2, an input method processing method provided in an exemplary embodiment includes:

S101: A user equipment receives an input method enabling instruction.

A user may trigger the input method enabling instruction by using a keyboard or a mouse. For example: the input method enabling instruction may directly be triggered by using "Ctrl+Space" or another command.

S102: The user equipment sends an input method enabling request to a server.

S103: After receiving the input method enabling request sent by the user equipment, the server encodes input method enabling indication information to first data according to the input method enabling request, to obtain first instruction data, where the first instruction data is used by the user equipment to perform rendering to obtain a first interactive application interface.

The first data may be game interface data, and encoding the input method enabling indication information to the first data can implement an embodiment in which, on the user equipment side, a task graph of the input method can be rendered on a game interface.

S104. The server sends the first instruction data to the user equipment.

S105: The user equipment enables the local input method according to the input method enabling indication information obtained by decoding the first instruction data.

The user equipment performs decoding and rendering according to a data sequence in the first instruction data, after obtaining the input method enabling indication information by decoding, enables the local input method, and renders the task graph of the local input method.

S106: The user equipment renders the first interactive application interface and a task graph of the local input method according to the first instruction data, for example, the task graph of the local input method may be displayed on the first interactive application interface.

For understanding of displaying the local input method at the Retrace end, descriptions are made with reference to FIG. 3 to FIG. 6.

Figure 3:
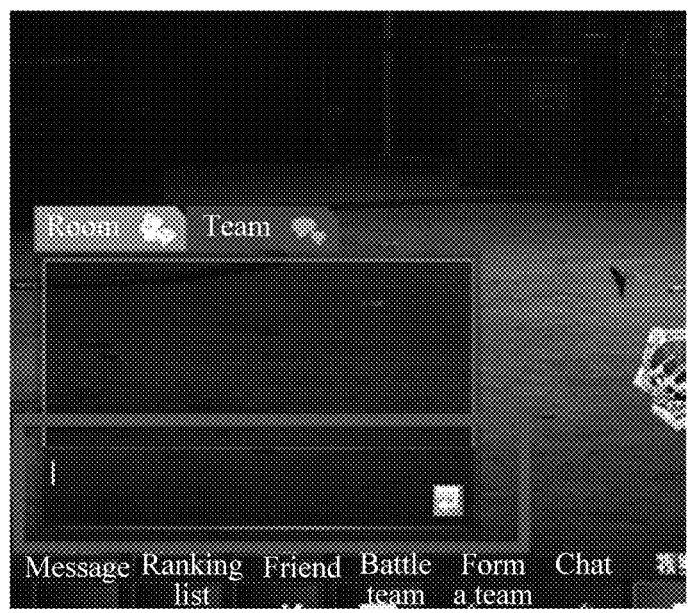
FIG. 3 is an example diagram of a game interface according to an exemplary embodiment.
Figure 4:
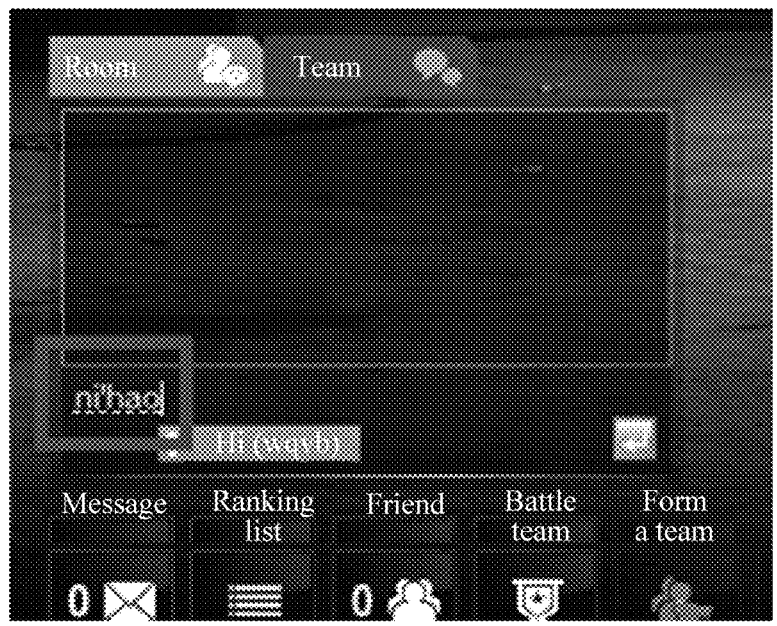
FIG. 4 is another example diagram of a game interface according to an exemplary embodiment.
Figure 5:
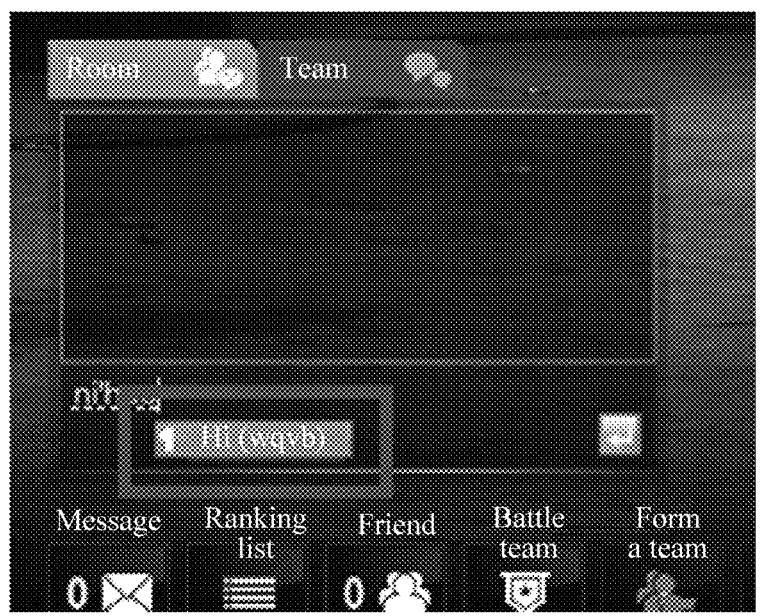
FIG. 5 is another example diagram of a game interface according to an exemplary embodiment.
Figure 6:
FIG. 6 is another example diagram of a game interface according to an exemplary embodiment.

For example, as shown in FIG. 3, a game interface of the user equipment displays a text box of the input method. A word-forming character string (shown in FIG. 4), an alternative character string (shown in FIG. 5), and an input method status bar (shown in FIG. 6) of the input method are then displayed on the game interface of the user equipment by using an API of the game, so that the user conveniently enters text.

The word-forming character string, the alternative character string, and the input method status bar of the input method are on the game interface of the user equipment, and the word-forming character string, the alternative character string, and the input method status bar are rendered on the game interface by using a graphic rendering interface.

Optionally, after the task graph of the local input method is displayed on the first interactive application interface, before the input method disabling indication information is received, even when the interactive application interface changes, the text box of the input method may be still displayed on the current interactive application interface.

Optionally, the user may enter text in the text box shown in FIG. 3, for example, by entering the text and clicking an "enter" key to send the text. After the server receives the encoding information of the text, the server performs decoding, invokes the text to interactive application logic to which the current interactive application interface belongs, and synchronizes the text to a game interface of another online game player, thereby implementing text exchange.

A process of entering text in the text box may be a process in FIG. 3 to FIG. 6.

Figure 7:
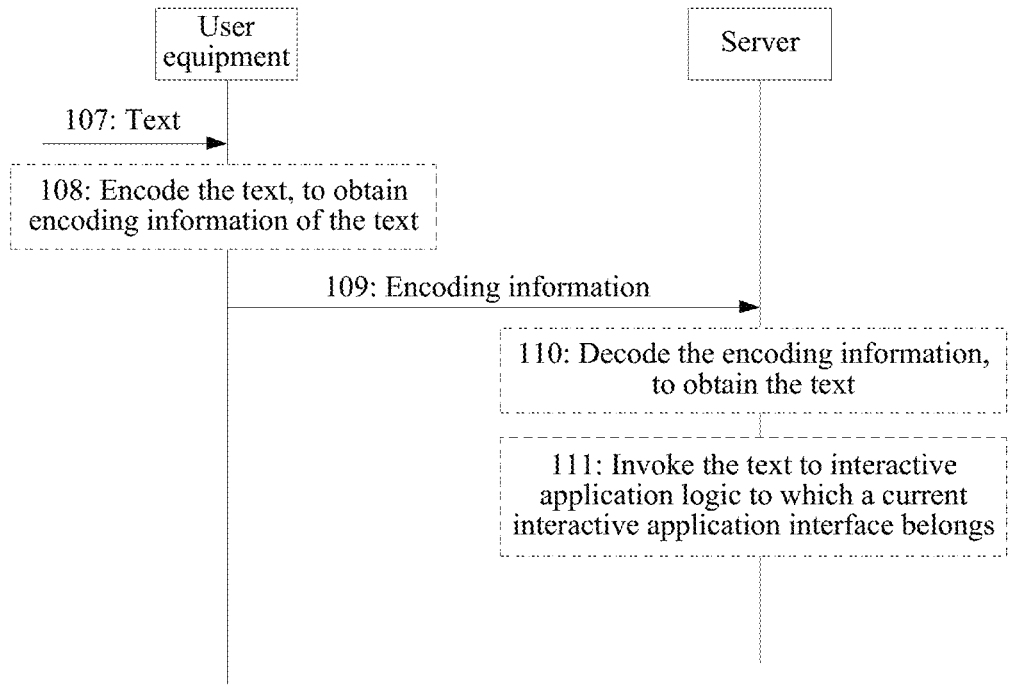
FIG. 7 is a schematic diagram of another example of an input method processing method according to an embodiment.

In the following, based on the embodiment corresponding to FIG. 2, the input method processing process in an exemplary embodiment is further described with reference to FIG. 7.

Steps 101 to 106 shown in FIG. 2 are not described in detail herein again to avoid repetitive descriptions.

S107: The user equipment obtains text inputted according to the local input method.

The user equipment renders, on the current interactive application interface, the word-forming character string and the alternative character string of the text on the current interactive application interface by using a graphic rendering interface.

S108: The user equipment encodes the text, to obtain encoding information of the text.

S109: The user equipment sends the encoding information to the server.

S110: After receiving the encoding information of the text that is sent by the user equipment, the server decodes the encoding information, to obtain the text.

S111: The server invokes the text to interactive application logic to which a current interactive application interface belongs.

The server sends the text to another user equipment that is displaying the current interactive application interface.

Figure 8:
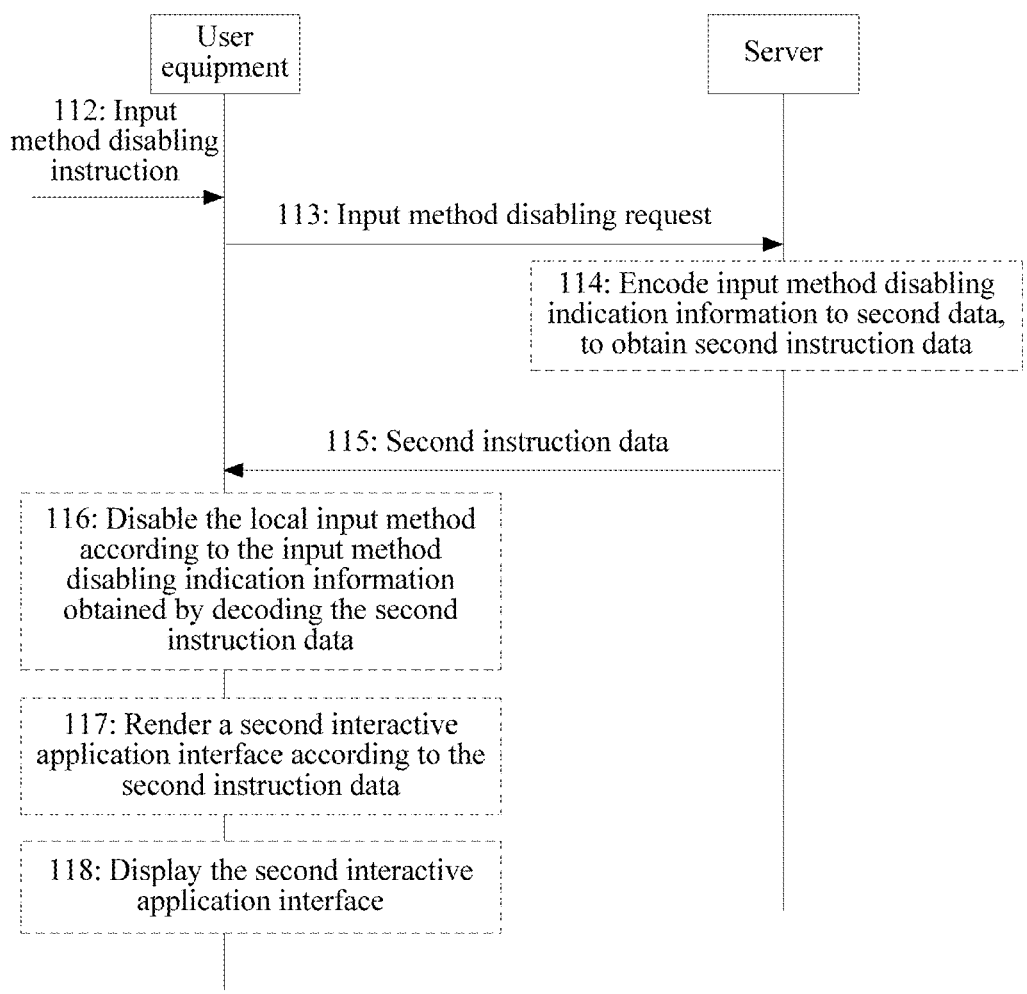
FIG. 8 is a schematic diagram of another example of an input method processing method according to an embodiment.

After the local input method is enabled, in a case, the local input method is disabled when no text is entered, and in another case, the local input method is disabled only after text is entered in the text box and the process of steps 107 to 111 is completed. In both cases, an input method disabling process may be performed, as described with reference to step 112 to step 118 in FIG. 8.

S112: The user equipment receives an input method disabling instruction.

S113: The user equipment sends an input method disabling request to the server after receiving the input method disabling instruction.

S114: The server encodes input method disabling indication information to second data according to the input method disabling request, to obtain second instruction data.

S115: The server sends the second instruction data to the user equipment.

S116: The user equipment disables the local input method according to the input method disabling indication information obtained by decoding the second instruction data. Referring to FIG. 7, the method may further include the following steps:

S117: The user equipment renders a second interactive application interface according to the second instruction data.

S118: The user equipment displays the second interactive application interface.

Actually, step 116 may be performed after step 117 because decoding and rendering may be performed at the same time, and the input method disabling indication information may be obtained by decoding in the end. Because the input method has been disabled, the user equipment renders only the second interactive application interface according to the second instruction data.

Figure 9:
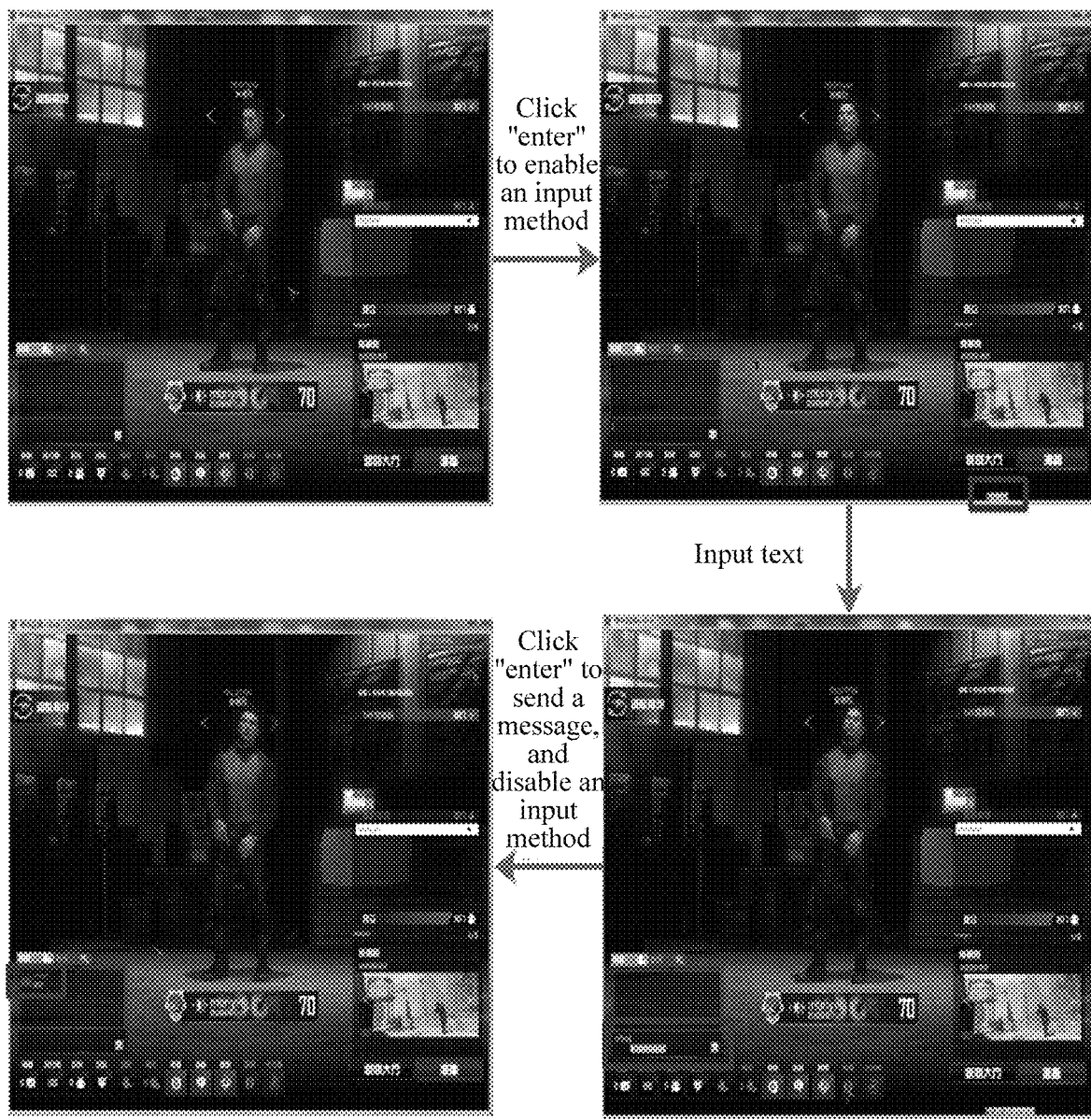
FIG. 9 is another example diagram of a game interface according to an exemplary embodiment.

For understanding of an exemplary process from input method enabling and text entering to input method disabling, descriptions are made with reference to FIG. 9, which shows a process of changing images.

In a 3D game, as shown in FIG. 9, input method enabling and disabling are generally controlled by using a keyboard event, and the input method is generally in a disabled state. For example, an "enter" key is used to start a chat dialog box, and after text is entered, the "enter" key is clicked to send the text, and the input method is disabled. Unlike an ordinary program, the input method cannot be enabled at the Retrace end by means of "Ctrl+Space", and enabling of the input method is controlled by the remote Trace end.

Figure 10:
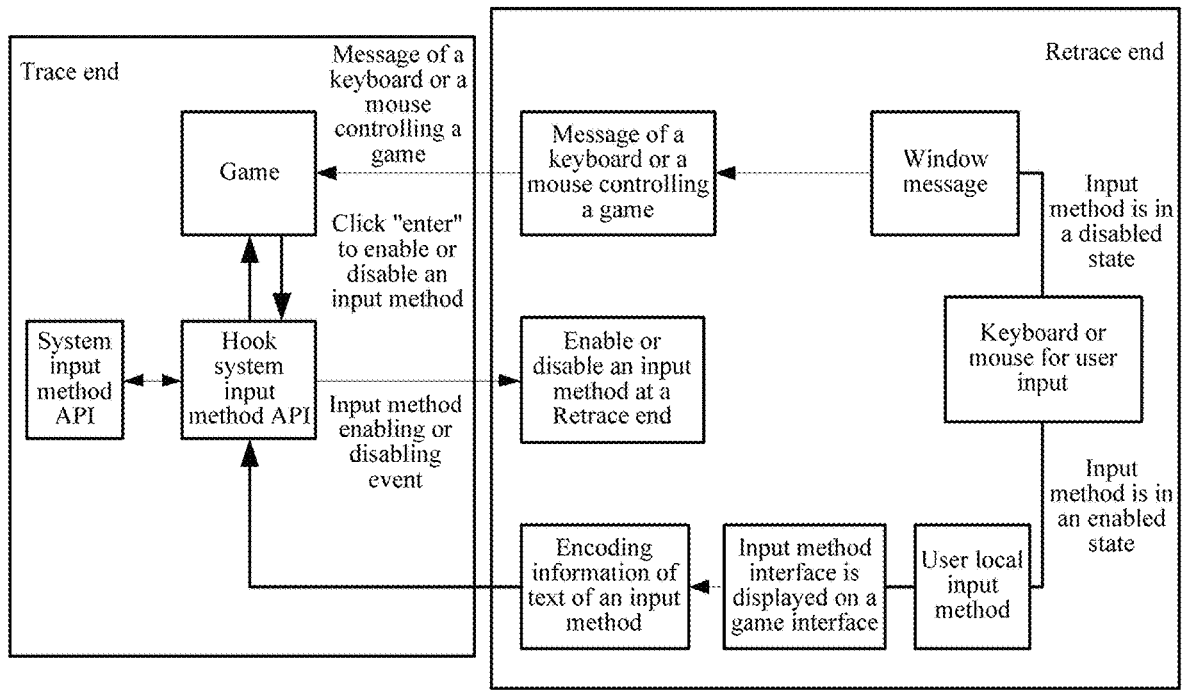
FIG. 10 is a schematic diagram of another example of an input method processing method according to an exemplary embodiment.

As shown in FIG. 10, an example in which an "enter" key is used to control input method enabling and disabling in a game is used to describe an input method processing method in an exemplary embodiment.

Step A: When a user enters a keyboard message by using a keyboard or a mouse, in response to an input method being in an enabled state, perform step B; or in response to the input method being in a disabled state, perform step C.

Step B: When the input method is in an enabled state, in response to "enter" being clicked, perform B-1 as shown in a solid-line arrow in FIG. 9 ("Click "enter" to send a message, and disable an input method"); otherwise, perform B-2.

B-1: When "enter" is clicked, send an "enter" message to a Trace end by means of streaming, and directly forward the message to a game; disable the input method in the game, enter a Hook input method API, and detect an input method disabling event; notify the input method disabling event to a Retrace end; and the Retrace end directly disables the input method and stops rendering an input method interface.

B-2: When "enter" is not clicked, a keyboard message is at a Retrace end for input method processing, and query whether an input state of the input method is that text input is completed; when yes, perform B-2-1; otherwise, perform B-2-2.

B-2-1: When text input is completed, query entered text code, and send the code to the Trace end by means of streaming, and the Trace end notifies the game by using a WM_CHAR message.

B-2-2: When text input is not completed, and the input method is switched, query an input method state again, and update an entered rendering interface; otherwise, query a word-forming character string and an alternative character string, and render the word-forming character string and the alternative character string on a game interface.

Step C: When the input method is in a disabled state, in response to "enter" being clicked, perform C-1; otherwise, perform C-2.

C-1: When "enter" is clicked, send an "enter" message to a Trace end by means of streaming, and directly forward the message to a game; the game enables an input method and enters a Hook input method API; detect an input method enabling event; notify the input method enabling event to a Retrace end; and the Retrace end directly enables the input method, queries an input method state, and renders an input method state bar on a game interface.

C-2: When "enter" is not clicked, it indicates that a game control message is entered, directly send the message to the Trace end by means of streaming, and forward, by using a window message, the message to the game for processing.

Figure 11:
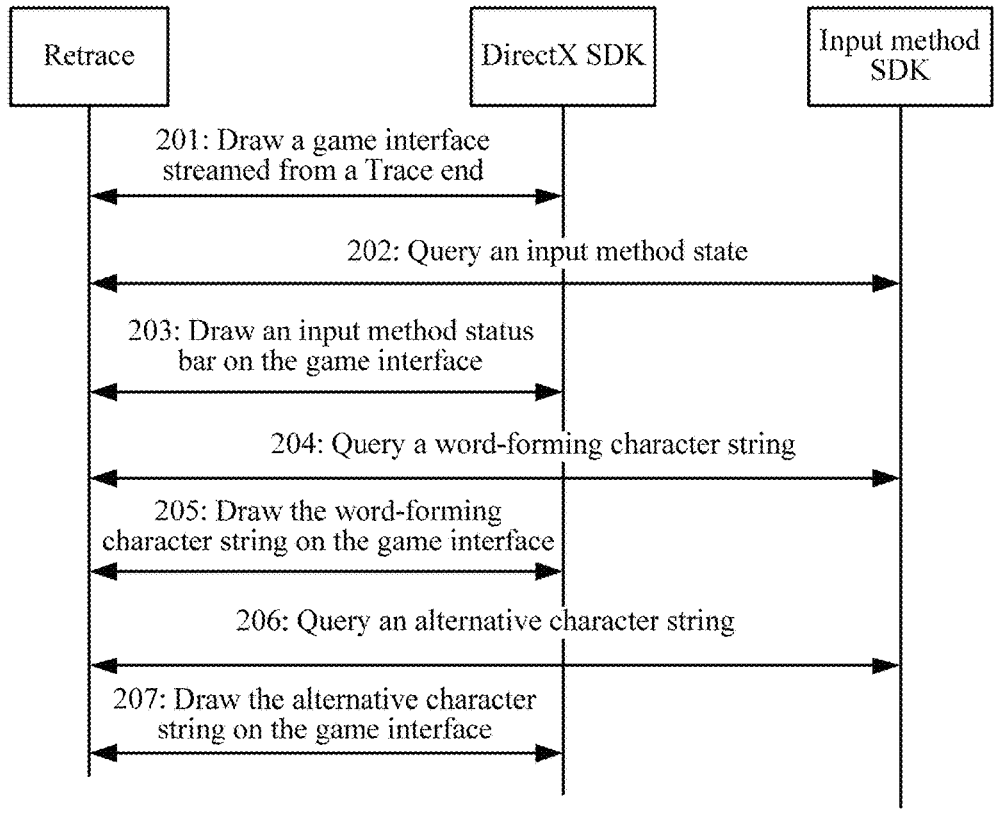
FIG. 11 is a schematic diagram of a processing process of each frame data of a user equipment according to an exemplary embodiment.

When the cloud game is in the input method enabled state, at the Retrace end, a processing process of each frame data of the game is shown in FIG. 11, which is described below.

S201: The Retrace end renders, by using DirectX SDK, a game interface instruction sent from the Trace end by means of streaming.

S202: The Retrace end queries an input method state from input method SDK.

S203: The Retrace end renders an input method status bar on a recently rendered image.

S204: The Retrace end queries a word-forming character string of the input method from the input method SDK.

S205: The Retrace end renders the word-forming character string on a recently rendered image.

S206: The Retrace end queries an alternative character string of the input method from the input method SDK.

S207: The Retrace end renders the alternative character string on the recently rendered image, to complete rendering of a current frame.

The method may be applied to a cloud game using a 3D technology, so that a user selects an input method installed on a machine of the user, enters text in a game of a Trace end, and communicates with an online player. In addition, in a process of entering text, an input method state, a word-forming character string, and an alternative character string can be seen at a Retrace end, so that the user conveniently enters text in a cloud game.

The disclosure not only can be applied to a cloud game, but also can be applied to a remote desktop environment, so that an input method installed on a machine is used to enter text in a program that is on a remote desktop and that is implemented based on a 3D technology.

Figure 12:
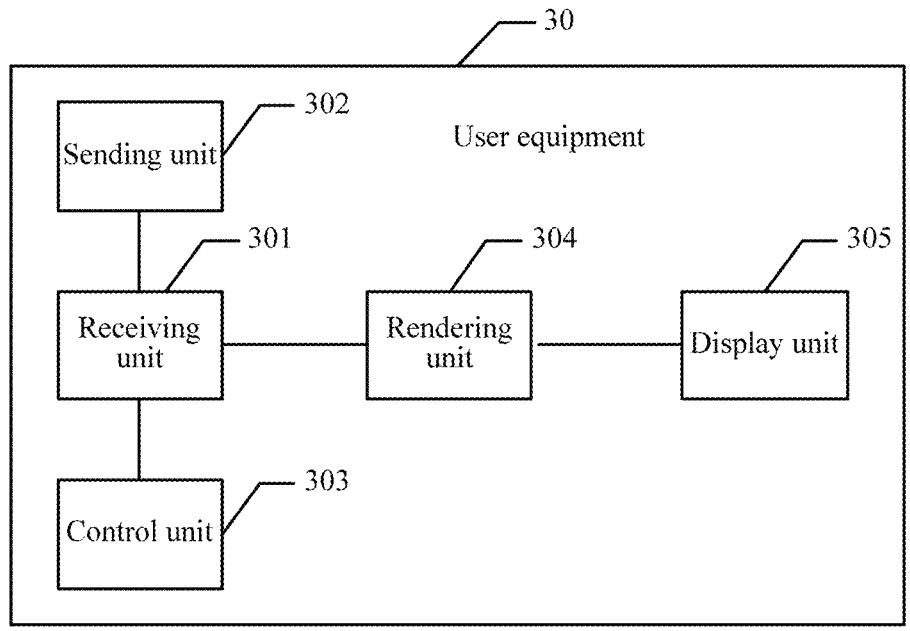
FIG. 12 is a schematic diagram of an example of a user equipment according to an exemplary embodiment.

Referring to FIG. 12, a user equipment 30 provided in an exemplary embodiment is applied to a cloud interaction system, and the cloud interaction system further includes a server. An embodiment of the user equipment 30 includes:

optionally, a receiving unit 301, configured to receive an input method enabling instruction;

a sending unit (or a transmitting unit) 302, configured to send an input method enabling request to the server after the receiving unit 301 receives the input method enabling instruction, where the input method enabling request is used to instruct the server to encode input method enabling indication information to first data, to obtain first instruction data, and the first instruction data is used by the user equipment to perform rendering to obtain a first interactive application interface, where the receiving unit 301 is further configured to receive the first instruction data sent by the server;

a control unit 303, configured to enable the local input method according to the input method enabling indication information obtained by decoding the first instruction data received by the receiving unit 301;

a rendering unit 304, configured to render a first interactive application interface and a task graph of the local input method according to the first instruction data received by the receiving unit 301; and optionally, a display unit (or a display) 305, configured to display the first interactive application interface and the task graph of the local input method that are rendered by the rendering unit 304.

Compared with the related art technology in which the local input method is separate from the interactive application, and when the interactive application interface is in a full-screen state, the local input method cannot be displayed, in the user equipment provided in the embodiments, the server may encode the input method indication instruction to data on the user rendering interface of the interactive application, to control the local input method on the user equipment to be displayed on the interactive application interface, and ensure that the local input method can always be normally displayed on the interactive application interface regardless of whether the interactive application interface is in any state.

Figure 13:
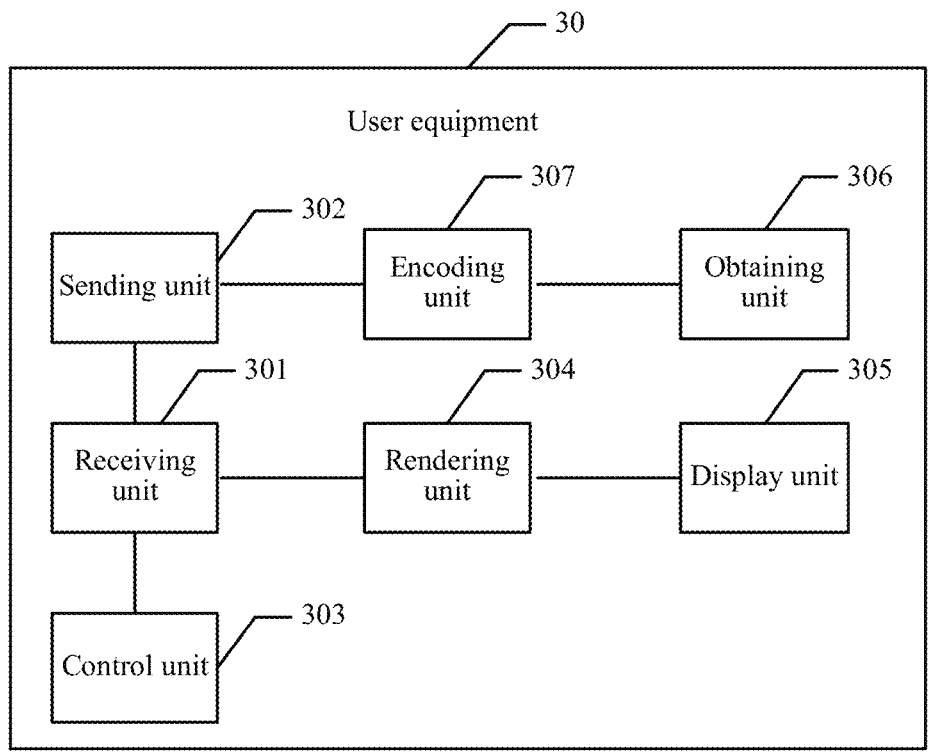
FIG. 13 is a schematic diagram of another example of a user equipment according to an exemplary embodiment.

Optionally, based on the embodiment corresponding to FIG. 12, referring to FIG. 13, in a first optional embodiment of the user equipment provided in an exemplary embodiment, the user equipment further includes: an obtaining unit 306 and an encoding unit 307, where the obtaining unit 306 is configured to obtain text inputted according to the local input method;

the encoding unit 307 is configured to encode the text obtained by the obtaining unit 306, to obtain encoding information of the text; and the sending unit 302 is configured to send the encoding information obtained by the encoding unit 307 by encoding to the server, where the encoding information is invoked, after being decoded by the server, to interactive application logic to which the current interactive application interface belongs.

Optionally, based on the embodiment corresponding to FIG. 12 or FIG. 13, in a second optional embodiment of the user equipment provided in an exemplary embodiment, the receiving unit 301 is further configured to receive an input method disabling instruction;

the sending unit 302 is further configured to send an input method disabling request to the server after the receiving unit 301 receives the input method disabling instruction, where the input method disabling request is used to instruct the server to encode input method disabling indication information to second data, to obtain second instruction data, and the second instruction data is used by the user equipment to perform rendering to obtain a second interactive application interface, where the receiving unit 301 is further configured to receive the second instruction data sent by the server; and the control unit 303 is further configured to disable the local input method according to the input method disabling indication information obtained by decoding the second instruction data received by the receiving unit 301;

the rendering unit 304 is further configured to render the second interactive application interface according to the second instruction data; and the display unit 305 is further configured to display the second interactive application interface rendered by the rendering unit 304.

Optionally, the rendering unit 304 is further configured to render, on a current interactive application interface, a word-forming character string and an alternative character string of the text on the current interactive application interface by using a graphic rendering interface.

Figure 14:
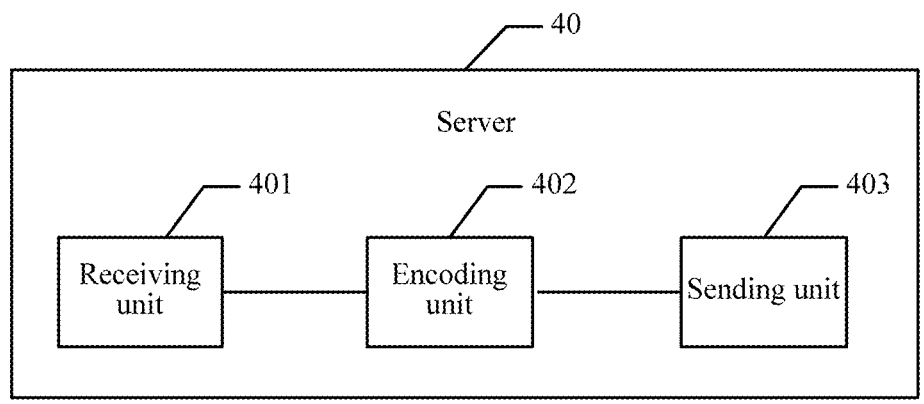
FIG. 14 is a schematic diagram of an example of a server according to an exemplary embodiment.

Referring to FIG. 14, a server 40 provided in an exemplary embodiment is applied to a cloud interaction system, and the cloud interaction system further includes a user equipment. An embodiment of the server includes:

a receiving unit 401, configured to receive an input method enabling request sent by the user equipment;

an encoding unit 402, configured to encode input method enabling indication information to first data according to the input method enabling request received by the receiving unit 401, to obtain first instruction data, where the first instruction data is used by the user equipment to perform rendering to obtain a first interactive application interface; and a sending unit 403, configured to send the first instruction data obtained by the encoding unit 402 by encoding to the user equipment, where the first instruction data is used by the user equipment to obtain the input method enabling indication information by decoding the first instruction data to enable a local input method, and render a first interactive application interface and a task graph of the local input method.

Compared with the related art technology in which the local input method is separate from the interactive application, and when the interactive application interface is in a full-screen state, the local input method cannot be displayed, the server provided in the exemplary embodiments may encode the input method indication instruction to data on the user rendering interface of the interactive application, to control the local input method on the user equipment to be displayed on the interactive application interface, and ensure that the local input method can always be normally displayed on the interactive application interface regardless of whether the interactive application interface is in any state.

Figure 15:
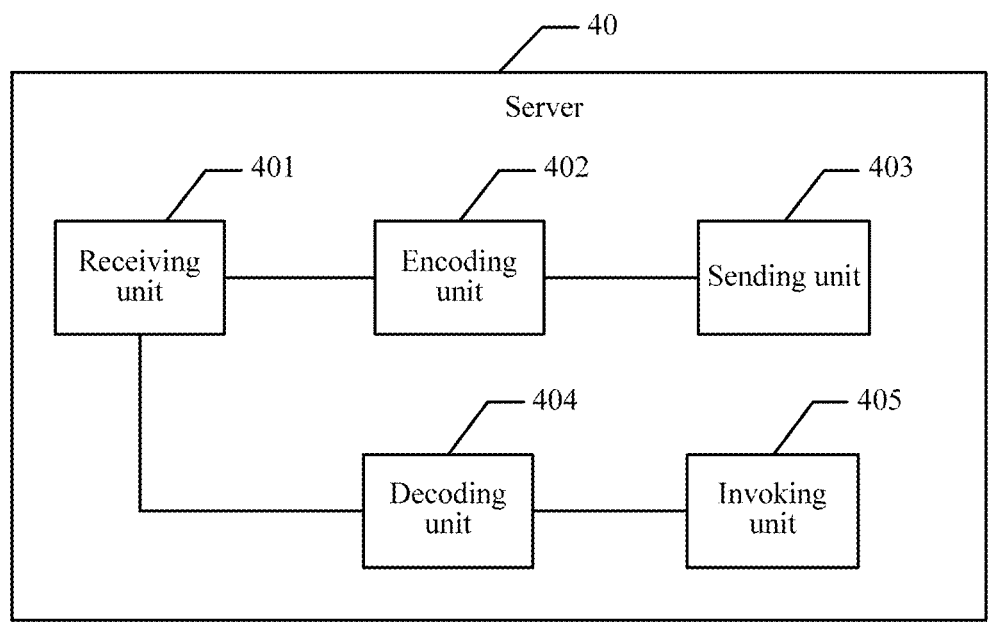
FIG. 15 is a schematic diagram of another example of a server according to an exemplary embodiment.

Optionally, based on the embodiment corresponding to FIG. 14, referring to FIG. 15, in a first optional embodiment of the server provided in an exemplary embodiment, the server further includes: a decoding unit 404 and an invoking unit 405, where the receiving unit 401 is further configured to receive encoding information of text sent by the user equipment;

the decoding unit 404 is configured to decode the encoding information received by the receiving unit 401, to obtain the text; and the invoking unit 405 is configured to invoke the text obtained by the decoding unit 404 by decoding to interactive application logic to which a current interactive application interface belongs.

Optionally, based on the embodiment corresponding to FIG. 14 or FIG. 15, in a second optional embodiment of the server provided in an exemplary embodiment, the receiving unit 401 is further configured to receive an input method disabling request sent by the user equipment;

the encoding unit 402 is further configured to encode input method disabling indication information to second data according to the input method disabling request received by the receiving unit 401, to obtain second instruction data, where the second instruction data is used by the user equipment to perform rendering to obtain a second interactive application interface; and the sending unit 403 is further configured to send the second instruction data to the user equipment, where the second instruction data is used by the user equipment to obtain input method disabling indication information by decoding the second instruction data to disable the local input method, and render a second interactive application interface.

Optionally, the sending unit 403 is further configured to send the text to another user equipment that is displaying the current interactive application interface.

Figure 16:
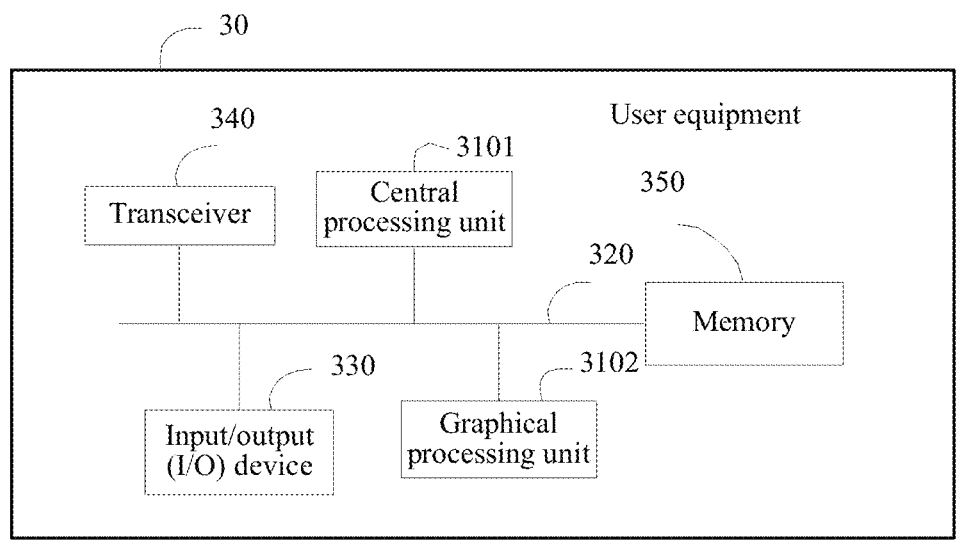
FIG. 16 is a schematic diagram of another example of a user equipment according to an exemplary embodiment.

FIG. 16 is a schematic structural diagram of a user equipment 30 according to an embodiment. The user equipment 30 is applied to a cloud interaction system, the cloud interaction system includes the user equipment and a server, and the user equipment 30 includes a central processing unit (CPU) 3101 and a graphical processing unit (GPU) 3102, a transceiver 340, a memory 350, and an input/output (I/O) device 330. The input/output (I/O) device 330 may be a keyboard or a mouse, the graphical processing unit 3102 is configured to perform graphical rendering, and the memory 350 may include a read-only memory and a random access memory, and provide an operation instruction and data to the processor 310. A part of the memory 350 may further include a non-volatile random access memory (NVRAM).

In some implementations, the memory 350 stores the following element, executable module, or data structure, or a subset thereof, or an extension set thereof.

In an exemplary embodiment, by invoking the operating instruction (the operating instruction may be stored in an operating system) stored by the memory 350, the input/output device 330 is configured to receive an input method enabling instruction;

the transceiver 340 is configured to: send an input method enabling request to the server, where the input method enabling request is used to instruct the server to encode input method enabling indication information to first data, to obtain first instruction data, and the first instruction data is used by the user equipment to perform rendering to obtain a first interactive application interface, and receive the first instruction data sent by the server;

the central processing unit 3101 is configured to enable the local input method according to the input method enabling indication information obtained by decoding the first instruction data;

the graphical processing unit 3102 is configured to render a first interactive application interface and a task graph of the local input method according to the first instruction data; and the input/output device 330 is further configured to display the first interactive application interface and the task graph of the local input method.

Compared with the related art technology in which the local input method is separate from the interactive application, and when the interactive application interface is in a full-screen state, the local input method cannot be displayed, in the user equipment provided in the exemplary embodiments, the server may encode the input method indication instruction to data on the user rendering interface of the interactive application, to control the local input method on the user equipment to be displayed on the interactive application interface, and ensure that the local input method can always be normally displayed on the interactive application interface regardless of whether the interactive application interface is in any certain state.

The central processing unit 3101 controls an operation of the user equipment 30. The memory 350 may include a read-only memory and a random access memory, and provides an instruction and data to the central processing unit 3101. A part of the memory 350 may further include an NVRAM. In a specific application, all components of the user equipment 30 are coupled by using a bus system 320, and besides a data bus, the bus system 320 may further include a power source bus, a control bus, a state signal bus, and the like. But, for ease of clear description, all types of buses in the diagram are marked as the bus system 320.

The method disclosed in the foregoing embodiments may be applied to the processor 310, or in other words, may be implemented by the processor 310. The processor 310 may be an integrated circuit chip and has a signal processing capability. In an implementation process, steps in the foregoing methods may be implemented through a hardware integrated logical circuit in the processor 310, or an instruction in the form of software. The processor 310 may be a general-purpose processor, a digital signal processor (DSP), an application-specific integrated circuit (ASIC), a field-programmable gate array (FPGA), another programmable logic component, a discrete gate or a transistor logic device, and a discrete hardware component, and may implement or execute methods, steps, and logical block diagrams disclosed in the embodiments. The general-purpose processor may be a micro-processor, or the processor may also be any conventional processor or the like. The steps in the methods disclosed in the embodiments may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 350, and the processor 310 reads information in the memory 350 and performs the steps of the foregoing methods in combination with hardware of the processor.

Optionally, the input/output device 330 is further configured to obtain text entered according to the local input method;

the central processing unit 3101 is further configured to encode the text, to obtain encoding information of the text; and the transceiver 340 is further configured to send the encoding information to the server, where the encoding information is invoked, after being decoded by the server, to interactive application logic to which the current interactive application interface belongs.

Optionally, the input/output device 330 is further configured to receive an input method disabling instruction;

the transceiver 340 is further configured to send an input method disabling request to the server, where the input method disabling request is used to instruct the server to encode input method disabling indication information to second data, to obtain second instruction data, and the second instruction data is used by the user equipment to perform rendering to obtain a second interactive application interface;

the transceiver 340 is further configured to receive the second instruction data sent by the server; and the central processing unit 3101 further disables the local input method according to the input method disabling indication information obtained by decoding the second instruction data;

the graphical processing unit 3102 renders a second interactive application interface according to the second instruction data; and the input/output device 330 is further configured to display the second interactive application interface.

Optionally, the graphical processing unit 3102 is configured to render, on a current interactive application interface, a word-forming character string and an alternative character string of the text on the current interactive application interface by using a graphic rendering interface.

For understanding of the user equipment 30, refer to related description in FIG. 1 to FIG. 11, and repetitive details are not described herein.

Figure 17:
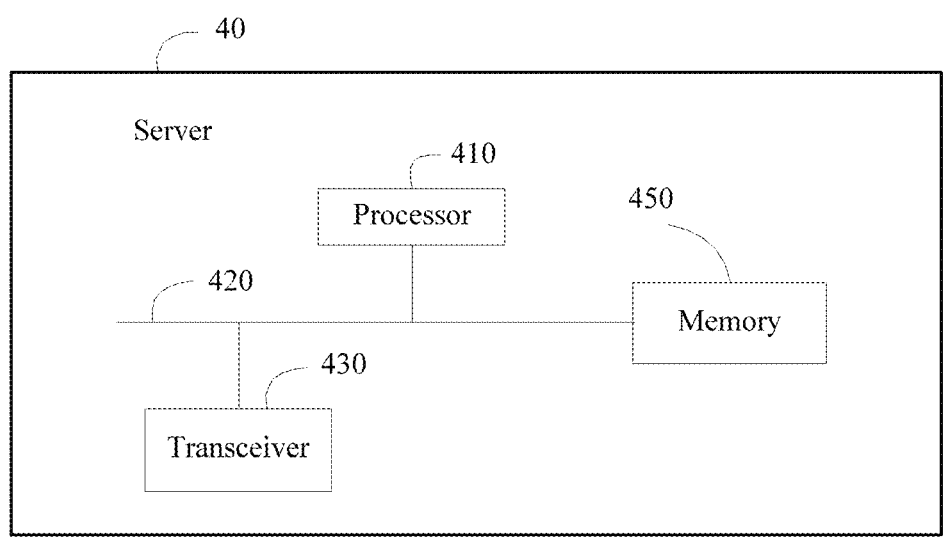
FIG. 17 is a schematic diagram of another example of a server according to an exemplary embodiment.

FIG. 17 is a schematic structural diagram of a server 40 according to an embodiment. The server 40 may be applied to a cloud interaction system, which includes a user equipment and a server. The server 40 includes a processor 410, a memory 450, and a transceiver 430, and the memory 450 may include a read-only memory and a random access memory, and provide an operation instruction and data to the processor 410. A part of the memory 450 may further include an NVRAM.

In some implementations, the memory 450 stores the following element, executable module, or data structure, or a subset thereof, or an extension set thereof.

In an exemplary embodiment, by invoking the operating instruction (the operating instruction may be stored in an operating system) stored by the memory 450, the transceiver 430 is configured to receive an input method enabling request sent by the user equipment;

the processor 410 is configured to encode input method enabling indication information to first data according to the input method enabling request, to obtain first instruction data, where the first instruction data is used by the user equipment to perform rendering to obtain a first interactive application interface;

the transceiver 430 is further configured to send the first instruction data to the user equipment, where the first instruction data is used by the user equipment to obtain the input method enabling indication information by decoding the first instruction data to enable a local input method, and render a first interactive application interface and a task graph of the local input method.

Compared with the related art technology in which the local input method is separate from the interactive application, and when the interactive application interface is in a full-screen state, the local input method cannot be displayed, the server provided in the exemplary embodiments may encode the input method indication instruction to data on the user rendering interface of the interactive application, to control the local input method on the user equipment to be displayed on the interactive application interface, and ensure that the local input method can always be normally displayed on the interactive application interface regardless of whether the interactive application interface is in any certain state.

The processor 410 controls an operation of the server 40, and the processor 410 may also be referred to as a central processing unit (CPU). The memory 450 may include a read-only memory and a random access memory, and provides an instruction and data to the processor 410. A part of the memory 450 may further include an NVRAM. In a specific application, all components of the server 40 are coupled by using a bus system 420, and in addition to a data bus, the bus system 420 may further include a power source bus, a control bus, a state signal bus, and the like. But, for ease of clear description, all types of buses in the diagram are marked as the bus system 420.

The method disclosed in the foregoing embodiments may be applied to the processor 410, or in other words, may be implemented by the processor 410. The processor 410 may be an integrated circuit chip and has a signal processing capability. In an implementation process, steps in the foregoing methods may be implemented through a hardware integrated logical circuit in the processor 410, or an instruction in the form of software. The processor 410 may be a general-purpose processor, a DSP, an ASIC, an FPGA, another programmable logic component, a discrete gate or a transistor logic device, and a discrete hardware component, and may implement or execute methods, steps, and logical block diagrams disclosed in the embodiments. The general-purpose processor may be a micro-processor, or the processor may also be any conventional processor or the like. The steps in the methods disclosed in the embodiments may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 450, and the processor 410 reads information in the memory 450 and performs the steps of the foregoing methods in combination with hardware of the processor.

Optionally, the transceiver 430 is further configured to receive encoding information of text sent by the user equipment; and the processor 410 is further configured to decode the encoding information, to obtain the text, and invoke the text to interactive application logic to which the current interactive application interface belongs.

Optionally, the transceiver 430 is further configured to receive an input method disabling request sent by the user equipment;

the processor 410 is further configured to encode input method disabling indication information to second data according to the input method disabling request, to obtain second instruction data, where the second instruction data is used by the user equipment to perform rendering to obtain a second interactive application interface; and the transceiver 430 is further configured to send the second instruction data to the user equipment, where the second instruction data is used by the user equipment to obtain input method disabling indication information by decoding the second instruction data to disable the local input method, and render a second interactive application interface.

Optionally, the transceiver 430 is further configured to send the text to another user equipment that is displaying the current interactive application interface.

For understanding of the server 40, refer to related description in FIG. 1 to FIG. 11, and repetitive details are not described herein.

For understanding of the cloud interaction system provided in an exemplary embodiment, refer to related description in FIG. 1 to FIG. 11, and repetitive details are not described herein.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disc, or an optical disc.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component, such as a processor or a circuit, and/or a software component that is executed by a hardware component such as a processor.

Compared with the related art technology in which the local input method is separate from the interactive application, and when the interactive application interface is in a full-screen state, the local input method cannot be displayed, in the methods and apparatus for input method processing according to the exemplary embodiments, the server may encode the input method indication instruction to data on the user rendering interface of the interactive application, to control the local input method on the user equipment to be displayed on the interactive application interface, and ensure that the local input method can always be normally displayed on the interactive application interface regardless of whether the interactive application interface is in any certain state.

The input method processing method and device and a system provided in the embodiments are described in detail above. Principles and implementations of the disclosure have been explained herein with reference to specific embodiments. The embodiments are used only to help understand the method and core thought of the disclosure. Meanwhile, a person with ordinary skills in the art can have variations in specific implementations and the application scope based on thoughts of the disclosure. In conclusion, content of the present specification should not be regarded as a limitation on the disclosure.

What is claimed is:

1. An input method processing method in a cloud interaction system, the cloud interaction system comprising a user equipment and a server, the method performed by at least one computer processor and comprising:
    transmitting, by the user equipment, an input method enabling request to the server in response to receiving an input method enabling instruction while an interaction application is provided from the server and executed on the user equipment and a local input method is disabled to receive a text input on the interaction application, the input method enabling request being used to instruct the server to encode input method enabling indication information to first data, to obtain first instruction data;
    receiving, by the user equipment, the first instruction data from the server;
    enabling, by the user equipment, the local input method to receive the text input according to the input method enabling indication information obtained by decoding the first instruction data; and
    rendering, by the user equipment on the interaction application, a first interactive application interface and a task graph of the local input method according to the first instruction data.

2. The method according to claim 1, further comprising:
    obtaining, by the user equipment, a text inputted according to the local input method;
    encoding, by the user equipment and obtaining, by the user equipment, encoding information based on a result of encoding; and
    transmitting, by the user equipment, the encoding information to the server, wherein the encoding information is invoked, after being decoded by the server, to interactive application logic to which a current interactive application interface belongs.

3. The method according to claim 2, further comprising, after the obtaining, by the user equipment, the text inputted according to the local input method:
    rendering, by the user equipment, a word-forming character string and/or an alternative character string of the text on the current interactive application interface by using a graphic rendering interface.

4. The method according to claim 1, further comprising:
    transmitting, by the user equipment, an input method disabling request to the server in response to receiving an input method disabling instruction, wherein the input method disabling request is used to instruct the server to encode input method disabling indication information to second data, to obtain second instruction data;
    receiving, by the user equipment, the second instruction data from the server; and
    disabling, by the user equipment, the local input method according to the input method disabling indication information obtained by decoding the second instruction data.

5. The method according to claim 4, further comprising, after the disabling the local input method:
    rendering, by the user equipment, a second interactive application interface according to the second instruction data; and
    displaying, by the user equipment, the second interactive application interface.

6. An input method processing method in a cloud interaction system, the cloud interaction system comprising a user equipment and a server, the method performed by at least one computer processor and comprising:
    receiving, by the server, an input method enabling request from the user equipment while an interaction application is provided from the server and executed on the user equipment and a local input method is disabled to receive a text input on the interaction application;
    encoding, by the server, input method enabling indication information to first data according to the input method enabling request, to obtain first instruction data; and
    transmitting, by the server, the first instruction data to the user equipment, the first instruction data being used by the user equipment to obtain the input method enabling indication information by decoding the first instruction data to enable the local input method to receive the text input, and render, on the interaction application, a first interactive application interface and a task graph of the local input method.

7. The method according to claim 6, further comprising:
    receiving, by the server, encoding information of a text from the user equipment;
    decoding, by the server, the encoding information, to obtain the text; and
    invoking, by the server, the text to interactive application logic to which a current interactive application interface belongs.

8. The method according to claim 7, further comprising, after the invoking, by the server, the text to the interactive application logic to which the current interactive application interface belongs:
    transmitting, by the server, the text to another user equipment that displays the current interactive application interface.

9. The method according to claim 6, further comprising:
    receiving, by the server, an input method disabling request from the user equipment;
    encoding, by the server, input method disabling indication information to second data according to the input method disabling request, to obtain second instruction data; and
    transmitting, by the server, the second instruction data to the user equipment, wherein the second instruction data is used by the user equipment to obtain the input method disabling indication information by decoding the second instruction data to disable the local input method, and render a second interactive application interface.

10. A user equipment in a cloud interaction system, the cloud interaction system comprising a server and the user equipment, the user equipment comprising at least one computer processor and at least one memory storing instructions which, when executed by the at least one computer processor, cause the at least one computer processor to:
transmit an input method enabling request to the server in response to receiving an input method enabling instruction while an interaction application is provided from the server and executed on the user equipment and a local input method is disabled to receive a text input on the interaction application, the input method enabling request being used to instruct the server to encode input method enabling indication information to first data, to obtain first instruction data,
receive the first instruction data from the server;
enable the local input method the receive the text input according to the input method enabling indication information obtained by decoding the first instruction data; and
render, on the interaction application, a first interactive application interface and a task graph of the local input method according to the first instruction data.

11. The user equipment according to claim 10, wherein the instructions, when executed by the at least one computer processor, further cause the at least one computer processor to:
display the first interactive application interface and the task graph of the local input method that are rendered.

12. The user equipment according to claim 10, wherein the instructions, when executed by the at least one computer processor, further cause the at least one computer processor to:
obtain text inputted according to the local input method;
encode the text and obtain encoding information based on a result of encoding of the text; and
transmit the encoding information to the server, wherein the encoding information is invoked, after being decoded by the server, to interactive application logic to which a current interactive application interface belongs.

13. The user equipment according to claim 12, wherein the instructions, when executed by the at least one computer processor, further cause the at least one computer processor to:
render, on the current interactive application interface, a word-forming character string and/or an alternative character string of the text on the current interactive application interface by using a graphic rendering interface.

14. The user equipment according to claim 10, wherein the instructions, when executed by the at least one computer processor, further cause the at least one computer processor to:
receive an input method disabling instruction;
transmit an input method disabling request to the server in response to receiving the input method disabling instruction, wherein the input method disabling request is used to instruct the server to encode input method disabling indication information to second data, to obtain second instruction data;
receive the second instruction data from the server; and
disable the local input method according to the input method disabling indication information obtained by decoding the second instruction data.

15. The user equipment according to claim 14, further comprising a display,
wherein the instructions, when executed by the at least one computer processor, further cause the at least one computer processor to:
render a second interactive application interface according to the second instruction data; and
display the second interactive application interface on the display of the user equipment.

16. A server in a cloud interaction system, the cloud interaction system comprising a user equipment and the server, the server comprising at least one computer processor and at least one memory storing instructions which, when executed by the at least one computer processor, cause the at least one computer processor to:
receive an input method enabling request from the user equipment while an interaction application is provided from the server and executed on the user equipment and a local input method is disabled to receive a text input on the interaction application;
encode input method enabling indication information to first data according to the input method enabling request, to obtain first instruction data; and
transmit the first instruction data to the user equipment, the first instruction data being used by the user equipment to obtain the input method enabling indication information by decoding the first instruction data to enable the local input method to receive the text input, and render, on the interaction application, a first interactive application interface and a task graph of the local input method.

17. The server according to claim 16, wherein the instructions, when executed by the at least one computer processor, further cause the at least one computer processor to:
receive encoding information of text from the user equipment;
decode the encoding information, to obtain the text; and
invoke the text obtained by decoding to interactive application logic to which a current interactive application interface belongs.

18. The server according to claim 17, wherein the instructions, when executed by the at least one computer processor, further cause the at least one computer processor to:
transmit the text to another user equipment that displays the current interactive application interface.

19. The server according to claim 16, wherein the instructions, when executed by the at least one computer processor, further cause the at least one computer processor to:
receive an input method disabling request from the user equipment;
encode input method disabling indication information to second data according to the input method disabling request, to obtain second instruction data; and
transmit the second instruction data to the user equipment, wherein the second instruction data is used by the user equipment to obtain the input method disabling indication information by decoding the second instruction data to disable the local input method, and render a second interactive application interface.

* * * * *